United States Patent [19]

Swoager

[11] 3,744,244

[45] July 10, 1973

[54] HYDROSTATIC DRIVE
[75] Inventor: Jon R. Swoager, Imperial, Pa.
[73] Assignee: Automation Equipment, Inc., Imperial, Pa.
[22] Filed: July 30, 1971
[21] Appl. No.: 167,580

[52] U.S. Cl..................60/454, 60/464, 418/47
[51] Int. Cl. ........................................ F15b 15/18
[58] Field of Search ............ 60/53 R, 53 A, 52 HC; 418/47

[56] References Cited
UNITED STATES PATENTS

| | | | |
|---|---|---|---|
| 2,962,977 | 12/1960 | Klessig et al. | 418/47 |
| 3,302,390 | 2/1967 | Christenson et al. | 60/53 R |
| 3,383,857 | 5/1968 | Rajchel et al. | 60/53 A |
| 3,522,704 | 8/1970 | Martin | 418/53 A |
| 3,650,108 | 3/1972 | Isaac | 418/53 R |

Primary Examiner—Edgar W. Geoghegan
Attorney—Stein, Wettach, Yeager

[57] ABSTRACT

A control system for a closed circuit hydrostatic drive including means for positive filtration of fluid replenishing fluid losses in the closed circuit and means for filtering fluid flowing in the closed circuit. The system provides valves for relieving excessive pressure generated within the closed circuit and the replenishment system.

3 Claims, 1 Drawing Figure

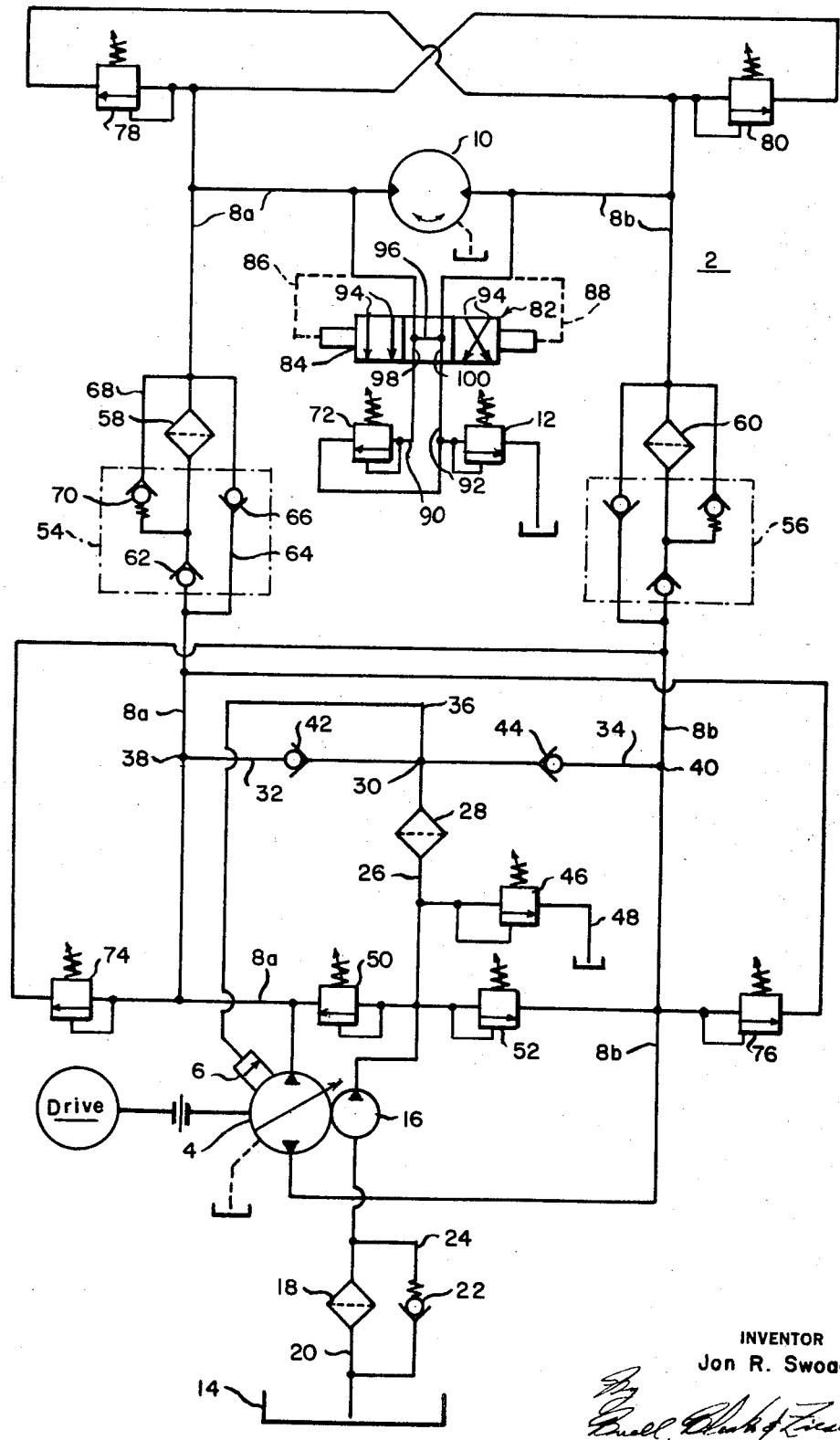

HYDROSTATIC DRIVE

This invention relates to an improved hydraulic drive; more particularly to a control system for use in closed circuit (sometimes called closed "loop") hydrostatic drives. The terms hydrostatic transmission and hydrostatic drive may be used interchangably for the purpose of this invention and are taken to mean any hydraulic drive in which a positive displacement pump and a motor transfer rotary power by means of fluid under pressure.

In a closed circuit hydrostatic drive, the pump and motor are connected inlet-to-outlet to form a closed loop for flow of hydraulic fluid. During typical operation of a closed circuit system of this type, considerable quantities of hydraulic fluid are drained from the system for the purpose of introducing fresh cool fluid to maintain proper temperatures within the system. Thus, it is necessary to provide means for supplying "make-up" or "replenishing" fluid to the closed circuit.

The continual introduction of replenishing fluid into the closed circuit hydrostatic drive makes the replenishing system a potent source of contamination of the fluid within the closed circuit. The contaminants may include metal particles abraded from system components as equipment deterioration occurs and other solid substances which enter the system from the environment in which the hydrostatic drive is operating. For example, hydrostatic drives are widely used on mining machines and are constantly subjected to the dust and dirt created in mining operations.

It has been found that the failure of expensive components in the closed circuit, such as the pump, the servo unit which controls the pump, or the motor, may often be traced to the presence of foreign substances in the fluid circulating in the closed loop. It becomes desirable, therefore, to filter these contaminants from the source of replenishing fluid.

Suction filtration is generally unsatisfactory in removing contaminants from make-up fluid in a hydrostatic drive system because it is dependent upon vacuum to provide the pressure differential necessary to generate full flow within the system. Full flow can only be assured by the use of large filtering surfaces and hence large components. In many applications where hydrostatic drives are used, large equipment components cannot be tolerated; for example, where a mining machine must be operated within a confined space underground.

Other problems which frequently occur in existing hydrostatic drives include: (i) damage to system components by the instantaneous generation of extremely high pressures, either at the pump or the motor; and (ii) reduction or complete stoppage of the flow of fluid in the closed loop due to valve malfunctions, thereby creating excessive temperatures in the loop.

I have discovered a control system for use in closed circuit hydrostatic drives which overcomes the foregoing problems. My system provides positive filtration of all fluid entering the closed loop and fail-safe protection for the make-up pump and filter against over-pressurization. My system also includes provisions for supplying filtered control oil to the servo unit which actuates the closed loop pump. My system further includes positive protection against peaking pressures generated by the pump or motor and insures a continual supply of cooling fluid to the closed loop despite equipment malfunctions.

I provide in a closed circuit hydraulic drive including a first pump for supplying fluid under pressure to a motor through the closed circuit and a second pump for supplying replenishing fluid to the closed circuit from a source of fluid, a control system comprising: a filter having an inlet and an outlet, the inlet being connected to the pressure side of the second pump; relief valve means disposed between the second pump and the inlet of said filter for returning fluid to the source; and a manifold connected to the outlet of the filter for distributing the replenishing fluid to the closed circuit.

I further provide, in a closed circuit hydraulic drive as described wherein the first pump is actuated by servo means, that the manifold distributes replenishing fluid also to the servo means.

I further provide, in a closed circuit hydraulic drive including a first pump for supplying fluid under pressure to a motor selectively through first and second conduit means, and a second pump for replenishing fluid to the closed circuit from a source of fluid; a control system comprising: a first filter having an inlet and an outlet, the inlet being connected to the pressure side of the second pump; relief valve means disposed between the second pump and the inlet for returning fluid to the source; a manifold connected to the outlet of the filter for distributing the replenishing fluid to the closed circuit; second and third filters disposed in the first and second conduit means respectively, each of the second and third filters being arranged for fluid passage therethrough; and first and second check valve means disposed in the first and second conduits, respectively, for selectively by-passing each of the second and third filters, and for permitting fluid passage through each of the second and third filters.

I preferably provide a pair of valve means each disposed between the first and second conduit means, respectively, and the pressure side of the second pump for relieving excessive pressure caused by any malfunction of the relief valve means.

I further provide, in a closed circuit hydraulic drive including a first pump for supplying fluid under pressure alternately through first and second conduit means to a motor, a control system comprising valve means disposed between the first and second conduit means for relieving excessive pressures generated by the pump and the motor.

Further, I provide, in a closed circuit hydraulic drive including a first pump for supplying fluid under pressure to a motor selectively through first and second conduit means, first and second valves means disposed within the motor for relieving high and low pressures within closed circuit, and a shuttle valve shiftable between a first position and a second position in response to alternations in pressure differential between the first and second conduits, the shuttle valve providing open communication between said first and second conduits, respectively, and the first and second valves means when the shuttle valve in its first and second positions, the improvement comprising: means disposed in the central portion of the shuttle valve for communicating the first and second conduit means with the first and second valve means.

Other details, objects and advantages of the invention will become apparent as the following description of a present preferred embodiment thereof proceeds.

In the accompanying drawing, I have shown a present preferred embodiment of the invention in which the FIGURE is a schematic of a closed circuit hydrostatic drive embodying the present invention.

Referring to the FIGURE, there is shown a closed loop hydrostatic drive with the loop itself designated generally by the reference numeral 2. The loop 2 includes a positive displacement pump 4 controlled by a suitable servo unit 6 which may be operated either automatically or manually. Pump 4 may be either a fixed displacement pump or a variable displacement pump depending upon the type of drive system required and will be sized to meet torque, speed and horsepower requirements. Pump 4 may also have a flow reversing capability as does the one illustrated in the Figure. A pair of conduits 8a and 8b form a path for fluid under pressure to flow from pump 4 to drive a hydraulic motor 10 and return to pump 4. Motor 10 may also be either of the fixed or variable displacement type, and, as in the motor illustrated, may be bi-directional.

As shown in the Figure, both pump 4 and motor 10 are reversible; thus the direction of fluid flow in loop 2 may be either clockwise or counterclockwise. If, for example, the state of pump 4 is such that conduit 8a is on the pressure side of pump 4, conduit 8a is said to be the "high pressure leg" and conduit 8b would be termed the "low pressure leg." In this condition, fluid will flow from pump 4 through conduit 8a for passage through motor 10 and thence return to pump 4 through conduit 8b. When the state of pump 4 is reversed, fluid flow is opposite to that just described and conduit 8b becomes the high pressure leg and conduit 8a becomes the low pressure leg. By way of example, when the present invention is employed on a mining machine, the fluid pressure in the pressure leg is usually about 3,000 p.s.i. and the pressure in the low pressure leg is about 150 p.s.i.

Other components are shown in conduits 8a and 8b and they will be described presently. It will now be convenient, however, to describe the "make-up," or "replenishing" system for the closed loop.

As fluid under pressure flows in loop 2, a certain quantity thereof is deliberately drawn from the loop by means of a low pressure valve 12 located in motor 10. The purpose of this draining is to permit the introduction of cool fluid from the replenishing system. In addition, there is a relatively minor amount of fluid loss from the loop through leakage (sometimes called "slip" loss). The system for replenishing these fluid losses includes a fluid reservoir 14 from which an auxiliary pump 16 draws fluid for replenishing the closed loop. Pump 16 may also be called a "charge" pump and in mining machine applications comprises an internal gear, constant displacement pump.

Typically, a suction type strainer 18 is interposed in the intake line 20 to pump 16 for removing oversized particles only. Magnets may be placed in strainer 18 for removing steel particles. If a filter is substituted for strainer 18, it would be desirable to include a relief valve 22 to protect the element of the filter from collapse in the event of clogging by providing a by-pass for fluid through conduit 24.

Fluid drawn from reservoir 12 is pumped through conduit 26 (as shown by the arrows on the Figure) to a pressure filter 28. Filter 28 is what is known as a full flow filter, i.e., all fluid must pass through the filter element. Exemplary of the filter that may be used when the present invention is applied to mining machines is a IF-1 type filter supplied by Schroeder Brothers Corporation. In this instance, the filter is rated as a 10 micron filter.

The fluid discharged from filter 28 passes to a manifold generally designated 30. In the embodiment shown, fluid flow along conduit 26 is split at manifold 30 into three conduits 32, 34 and 36. Conduit 32 carries fluid to a juncture 38 in conduit 8a; conduit 34 carries fluid to a juncture 40 in conduit 8b also in the closed loop; and conduit 36 carries fluid to servo unit 6. Since the pressure in the high pressure leg of closed loop 2 is higher than the pressure in the make-up system, it is necessary to provide one-way check valves 42 and 44 in conduits 32 and 34, respectively. Because of this pressure differential, it may be observed that replenishment of fluid to the closed loop proceeds only through a low pressure leg (8a or 8b as the case may be).

Referring back to the make-up system and particularly to the segment of conduit 26 between pump 16 and filter 28, there is shown a relief valve 46 of any suitable type which is ordinarily set to open at a pressure higher than the normal pressure of the low pressure leg of loop 2. In mining machine applications, for example, this pressure differential is about 50 p.s.i. The purpose of relief valve 46 is to protect pump 16 and filter 28 from damage due to excessive pressure build-up as for example on cold days when the hydraulic fluid is highly viscous. When relief valve 56 opens at a predetermined pressure, fluid being pumped through conduit 26 is permitted to return to reservoir 14 through conduit 48.

As mentioned above, additional components are present within closed loop 2. First, there are a pair of relief valves 50 and 52 connecting conduits 8a and 8b, respectively, with conduit 26 carrying the discharge of charge pump 16. Ordinarily relief valves 50 and 52 will be physically located in the discharge cavity of charge pump 16. The purpose of relief valves 50 and 52 is to relieve overpressure in conduit 26 in the event relief valve 46 malfunctions, thereby preventing the collapse of filter 28. This pressure relief would occur to the low pressure leg of loop 2 through the appropriate one of valves 50 and 52.

Other additional components is loop 2 include valve means generally designated 54 and 56, and pressure filters 58 and 60, respectively. Those valve means and filters are identical so only one set will be described. In the particular embodiment shown in the Figure, valve means 54 includes one-way check valve 62 positioned in conduit 8a between pump 4 and filter 58; conduit 64 by-passing filter 58 and check valve 62; one-way check valve 66 positioned in conduit 64; conduit 68 by-passing filter 58; and relief valve 70 positioned in conduit 68.

The operation of the components just described in closed loop 2 may be best described by describing a typical operation of the closed loop hydrostatic drive: Assuming conduit 8a is on the pressure side of pump 4, fluid under pressure will flow from pump 4 through conduit 8a and, because of the restriction of check valve 62, will by-pass filter 58 and check valve 62 by flowing through conduit 64 and thence through motor 10 to return to pump 4 through conduit 8b. Thus, when conduit 8a is the high pressure leg, no filtration of the hydraulic fluid passing through that conduit occurs.

When the state of pump 4 is reversed thereby changing conduit 8a to the low pressure leg, fluid flows from motor 10 through conduit 8a and passes through filter 58. Flow through conduit 64 is restricted by check valve 66. After passing through filter 58 and through check valve 62, the fluid is returned to pump 4. If necessary, relief valve 70 opens at a predetermined pressure differential to prevent the collapse of the filter element in filter 58. It will be readily understood that the operation of filter 60 and valve means 56 in conduit 8b corresponds to that just described. It will be further appreciated by those skilled in that art that the filtering function in the low pressure leg just described could be transposed by a re-arrangement of the valve means and the filter to accomplish filtering in the high pressure leg.

In the normal operation of a hydrostatic drive, the servo unit 6 on pump 4 cannot respond rapidly enough to dampen sudden pressure increases (sometimes called "peak pressures") caused by varying load requirements. There is, of course, a high pressure relief valve 72 built into motor 10, but it is not capable of dampening peak pressure for three reasons: (i) As for peak pressures generated by pump 4, relief valve 72 is too remote from pump 4 to respond immediately, and damage can occur within the time elapsed between the occurence of the pressure rise and that response; (ii) High pressure relief valve 72 is ordinarily a pilot-operated valve and thus has an inherent time lag in responding; and (iii) As to peak pressure generated at motor 10 itself, the fluid passing through motor 10 takes a tortuous path and accordingly there is an inherent delay in the sensing of peak pressures by relief valve 72.

The present invention overcomes the problems created by peak pressures in conventional hydrostatic drives by providing peaking relief valves located as closely as possible to the sources of those pressures. Referring to the Figure, it may be observed that a pair of relief valves 74 and 76 are disposed between conduits 8a and 8b, each valve being connected to conduits 8a and 8b, respectively, immediately adjacent to pump 4. Valves 74 and 76 sense the pressure differential between the high pressure leg and the low pressure leg of loop 2 and, being of the direct-acting type, respond immediately to relieve peak fluid pressures in the high pressure leg to the low pressure leg. Another pair of peaking relief valves 78 and 80 similarly arranged are shown connected adjacent to motor 10 and these valves also function in the manner just described.

It may be noted by way of illustration that in mining machine applications the peaking relief valves are set to operate at about 3,400 p.s.i. High pressure relief valve 72 located in motor 10 is set at about 3,500 p.s.i. and therefore it becomes the system safety valve and should not open except under unusual circumstances.

A further safeguard embodied in the present invention is an open center shuttle valve generally designated by the reference numeral 82. Shuttle valve 82 includes a spool 84 laterally shiftable in response to the reversal of the pressure differential between conduits 8a and 8b. Sensing conduits 86 and 88 coupled to conduits 8a and 8b, respectively, accomplish the hydraulic shifting of spool 84. It will be observed that when spool 84 is in its extreme left and right positions, conduits 8a and 8b, reversably connected through passageways 94 in the left and right portions of spool 84 to conduits 90 and 92, respectively, communicate with high pressure relief valve 72 and low pressure relief valve 12. If, however, high-rate oscillatory torque reversal occurs in loop 2, it is possible for pressure to build up in both legs of loop 2. This would cause spool 84 to center so that, in conventional hydrostatic drives, neither leg of loop 2 would be protected by relief valves 72 and 12. This condition is prevented in the present invention by the provision of an open center portion 96 of spool 8 having passageways 98 and 100 which insure communication of both legs of loop 2 with relief valves 72 and 12.

I claim:

1. In a closed circuit hydraulic drive including a first pump for supplying fluid under pressure to a motor selectively through first and second conduit means, and a second pump for replenishing fluid to said closed circuit from a source of fluid; a control system comprising:

a first filter having an inlet and an outlet, said inlet being connected to the pressure side of said second pump;

relief valve means disposed between said second pump and said inlet for returning fluid to said source;

a manifold connected to the conduit of said filter for distributing said replenishing fluid to said closed circuit;

second and third filters disposed in said first and second conduit means respectively, each of said second and third filters being arranged for fluid passage therethrough; and first and second check valve means disposed in said first and second conduits, respectively, for selectively by-passing each of said second and third filters, and for permitting fluid passage through each of said second and third filters.

2. A control system as recited in claim 1 which includes:

a pair of valve means each disposed between said first and second conduit means, respectively, and said pressure side of said second pump for relieving excessive pressure caused by any malfunction of said relief valve means.

3. In a closed circuit hydraulic drive including a first pump for supplying fluid under pressure to a motor selectively through first and second conduit means, first and second valves means disposed within said motor for relieving high and low pressures within closed circuit, and a shuttle valve shiftable between a first position and a second position in response to alternations in pressure differential between said first and second conduits, said shuttle valve providing open communication between said first and second conduits, respectively, and said first and second valves means when said shuttle valve in its first and second positions, the improvement comprising: means disposed in the central portion of said shuttle valve for communicating said first and second conduit means with said first and second valve means.

* * * * *